(12) United States Patent
Bercovici et al.

(10) Patent No.: US 9,703,585 B2
(45) Date of Patent: **\*Jul. 11, 2017**

(54) METHOD FOR LIVE MIGRATION OF VIRTUAL MACHINES

(71) Applicant: RADWARE, LTD., Tel Aviv (IL)

(72) Inventors: Samuel Bercovici, Givatayim (IL); Gilad Zlotkin, Mevaseret Zion (IL)

(73) Assignee: Radware, Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/607,566

(22) Filed: Jan. 28, 2015

(65) Prior Publication Data

US 2015/0143372 A1    May 21, 2015

Related U.S. Application Data

(63) Continuation of application No. 13/590,516, filed on Aug. 21, 2012, now Pat. No. 8,949,431.

(60) Provisional application No. 61/526,929, filed on Aug. 24, 2011.

(51) Int. Cl.
*G06F 9/50* (2006.01)
*G06F 9/455* (2006.01)
*G06F 9/48* (2006.01)

(52) U.S. Cl.
CPC ........ *G06F 9/45533* (2013.01); *G06F 9/4856* (2013.01)

(58) Field of Classification Search
CPC .... G06F 9/45533; G06F 9/4856; G06F 9/505; G06F 9/5077; G06F 9/5088
USPC ......................................................... 709/226
See application file for complete search history.

(56) References Cited

U.S. PATENT DOCUMENTS

| | | |
|---|---|---|
| 2001/0010053 A1 | 7/2001 | Ben-Shachar et al. |
| 2008/0222375 A1 | 9/2008 | Kotsovinos et al. |
| 2008/0244213 A1 | 10/2008 | Flemming et al. |
| 2008/0244214 A1 | 10/2008 | Flemming et al. |
| 2008/0244215 A1 | 10/2008 | Flemming et al. |
| 2010/0332658 A1* | 12/2010 | Elyashev ...................... 709/226 |
| 2011/0004735 A1* | 1/2011 | Arroyo et al. ................ 711/162 |
| 2011/0131569 A1 | 6/2011 | Heim |
| 2012/0066371 A1 | 3/2012 | Patel |
| 2012/0096459 A1 | 4/2012 | Miyazaki |
| 2012/0096460 A1 | 4/2012 | Sekiguchi et al. |
| 2012/0137292 A1 | 5/2012 | Iwamatsu et al. |
| 2012/0159634 A1 | 6/2012 | Haikney et al. |
| 2012/0166644 A1 | 6/2012 | Liu et al. |
| 2012/0185856 A1 | 7/2012 | Ashihara et al. |
| 2012/0192175 A1 | 7/2012 | Dorai et al. |

\* cited by examiner

*Primary Examiner* — Tu Nguyen
(74) *Attorney, Agent, or Firm* — M&B IP Analysts, LLC

(57) ABSTRACT

A method and system for an assisted live migration of virtual machines are provided. The method monitoring, by an advisory server, at least a workload of physical machines in a datacenter; determining if at least one physical machine is overloaded based on the monitored workload; for each of the at least one physical machine determined to be overloaded, selecting at least one virtual machine resides in the respective physical machine, wherein the selection is based at least on a current load of the virtual machine; and initiating a live migration of the selected virtual machine when the current load is lower than a comfort load level.

23 Claims, 6 Drawing Sheets

METHOD FOR LIVE MIGRATION OF VIRTUAL MACHINES

CROSS REFERENCE TO RELATED APPLICATION

This application is a continuation of U.S. patent application Ser. No. 13/590,516, filed Aug. 21, 2012, now allowed, which claims the benefit of U.S. provisional application No. 61/526,929, filed Aug. 24, 2011, the contents of which are herein incorporated by reference.

TECHNICAL FIELD

This disclosure generally relates to workload balancing of the utilization of resources of physical machines hosting virtual machines.

BACKGROUND

A virtual machine (VM) is a software implementation of a computer that executes programs in a way that is similar to a physical machine. The virtualization technology allows the sharing of the underlying physical hardware resources between different virtual machines, each running its own operating system (as a guest). The virtualization, which is typically performed by a hypervisor, allows multiple operating systems to run concurrently on a host computer. The hypervisor presents the guest operating systems with a virtual operating platform and monitors the execution of the guest operating systems. Further, the hypervisor defines the allocation of resources (e.g., CPU power, memory, network bandwidth, etc.) for each guest operating system.

Virtualization of computing and networking resources, such as servers, application delivery controllers (ADCs), and load balancers can improve the performance of a service provider's datacenters. Further, virtualization of such resources may reduce costs and overhead to the service providers. For example, most applications executed in datacenters utilize between 5% and 10% of the resources of physical machine CPUs most of the time. However, by deploying such applications as virtual machines in one physical machine, utilization of 80% can be achieved. This can be achieved without compromising the isolation and independence of the physical machines hosting the applications. As a result, adoption of virtualization technologies in datacenters has been rapidly increasing over the last few years to the extent that it is expected that most services will soon be deployed as virtual machines (VMs).

Typically, a single physical machine is not sufficient to support multiple VMs, as in most cases the average resource consumption may exceed the capacity of one physical machine. With this aim, the VMs are distributed among several physical machines, such that the total average resource consumption of the VMs in one physical machine does not exceed a configurable threshold (e.g. 80%) of the physical machine's capacity. However, because resource consumption by VMs dynamically varies, a physical machine may be overloaded by instances of peak utilization by the VMs it hosts. Therefore, there is a need to balance the utilization of resources of physical machines by VMs hosted therein. This task is known as a workload balancing (WLB).

Prior art solutions perform the workload balancing task by a VM migration process, which is schematically illustrated in FIG. 1. The VM migration process is also referred to as a "live VM migration" because the VM is transferred to a different physical machine during its operation.

For example, a physical machine 100 executes VMs 111, 112, and 113. When it is determined that the physical machine 100 is busy (e.g., over 80% utilization) one or more VMs 111-113 are migrated to a physical machine 120 to support the additional VMs. As illustrated in FIG. 1, VMs 111 and 113 are migrated to the physical machine 120. The VM migration process may be triggered by a user (e.g., a system administrator) or by a virtual machine controller 140 that monitors the performance of the datacenters. In both cases, the migration of VM machines is coordinated by the controller 140 and performed by the source and destination physical machines. Typically, the VM migration process requires that both the source physical machine (e.g., machine 100) and the target physical machine (e.g., machine 120) share the same storage 130 where the VM file-system (VMFS) resides. The controller 140 instructs the physical machine 100 to migrate VM 111 to the physical machine 120.

The VM migration process is performed by incrementally copying the CPU state and the memory image of the VM (e.g., VM 111), including the content of its registers, from the source physical machine to the target physical machine. Once the memory image has been copied, the execution of the VM on the source physical machine is halted, and execution then resumes on the target physical machine. The execution of the VM on the target physical machine 120 is resumed from the next instruction subsequent to the instruction step in which it was stopped.

Specifically, considering that the VM 111 on the source physical machine 100 runs during the migration process, the execution is switched over to the target machine 120 only when there is a small "delta" memory (the difference between "source" and "target" memory images) that needs to be copied. The delta memory is typically a pre-defined and configurable parameter (e.g., a number of memory pages).

The live VM migration also requires migrating network connections from the source to the target physical machines. Typically, the source and target physical machines are in the same IP subnet. Thus, when the VM is migrated to the target physical machine 120, the VM broadcasts address resolution protocol (ARP) messages indicating that the IP address has moved to a new physical location. As the VMFS resides on the shared storage 130, there is no need to synchronize large amounts of persistent data and the migration can be done while turning the VM off for a very short period of time.

However, the conventional live VM migration process is inefficient as it limits the performances of both the VMs and physical machines. Specifically, the conventional VM migration process suffers from the following drawbacks. First, the service throughout the VM is significantly degraded during the migration period, because the incremental memory replication of the VMs consumes CPU and network resources. Such degradations of service throughout can cause a temporary discontinuity of service at the switchover point in time. Even though such a discontinuity period may be short (e.g., up to a second), for mission critical applications, this cannot be tolerated. Moreover, the application performance degradation time can be much longer, which is also cannot be tolerated in mission critical applications.

In addition, the conventional live VM migration process consumes CPU and network resources used for copying the VM's memory image, thereby aggravating the situation on the congested physical machine. Moreover, the copying of the memory image from one machine to another may not be converged. This can happen, for example, when the source VM memory constantly changes in such a way that the delta memory state cannot meet the threshold set for the switch over. As a result, the process of moving the VM's state consumes computing resources required for the migration process, thereby degrading the performance of the source physical machines. This may also cause the live migration process to fail as it would take too long to move the VM from one machine to another.

The primary purpose for performing VM migration is to improve the performance and utilization of datacenters, but the conventional live VM migration approach cannot guarantee these objectives. In fact, conventional live VM migration processes may sacrifice the performance of datacenters or result in an underutilized datacenter. Thus, the conventional VM migration processes are an inefficient approach for workload balancing.

It would be therefore advantageous to provide a solution that would resolve the shortcomings of prior art techniques for workload balancing.

SUMMARY

Certain embodiments disclosed herein include a method and system for an assisted live migration of virtual machines. The method comprises monitoring, by an advisory server, at least a workload of physical machines in a datacenter; determining if at least one physical machine is overloaded based on the monitored workload; for each of the at least one physical machine determined to be overloaded, selecting at least one virtual machine residing in the respective physical machine, wherein the selection is based at least on a current load of the virtual machine; and initiating a live migration of the selected virtual machine when the current load is lower than a comfort load level.

BRIEF DESCRIPTION OF THE DRAWINGS

Various embodiments are particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
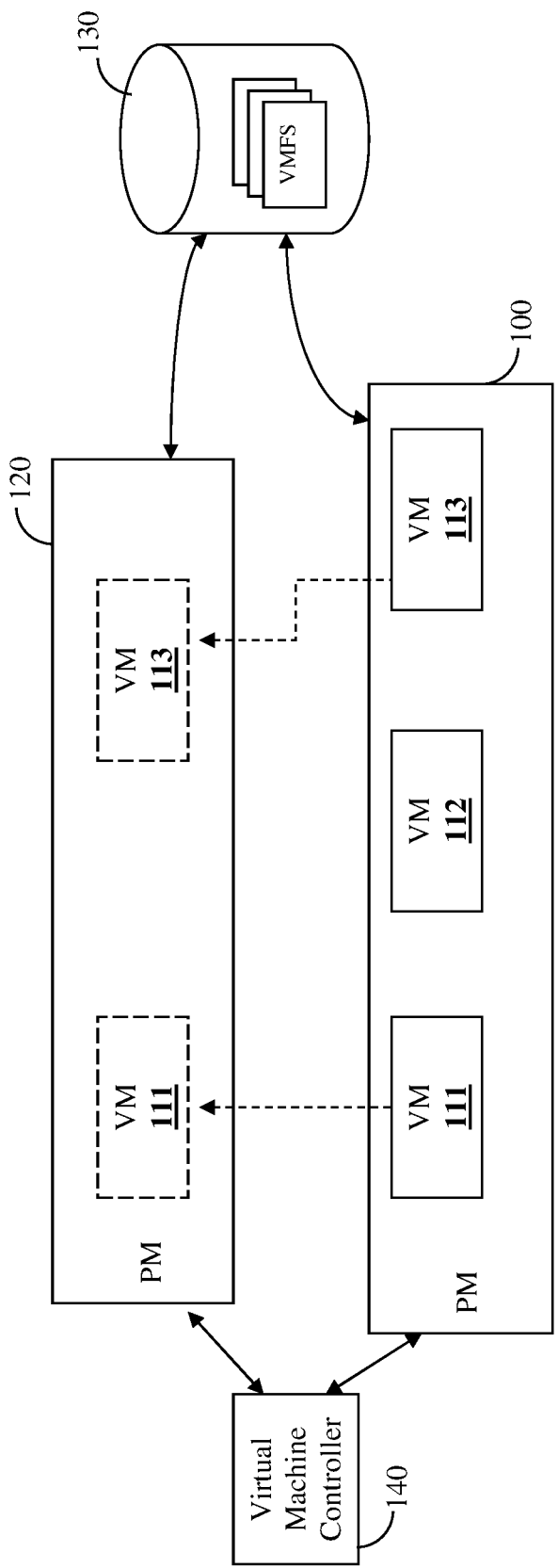
FIG. 1 is a schematic diagram illustrating the operation of a conventional VM migration process.

The embodiments disclosed herein are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Figure 2:
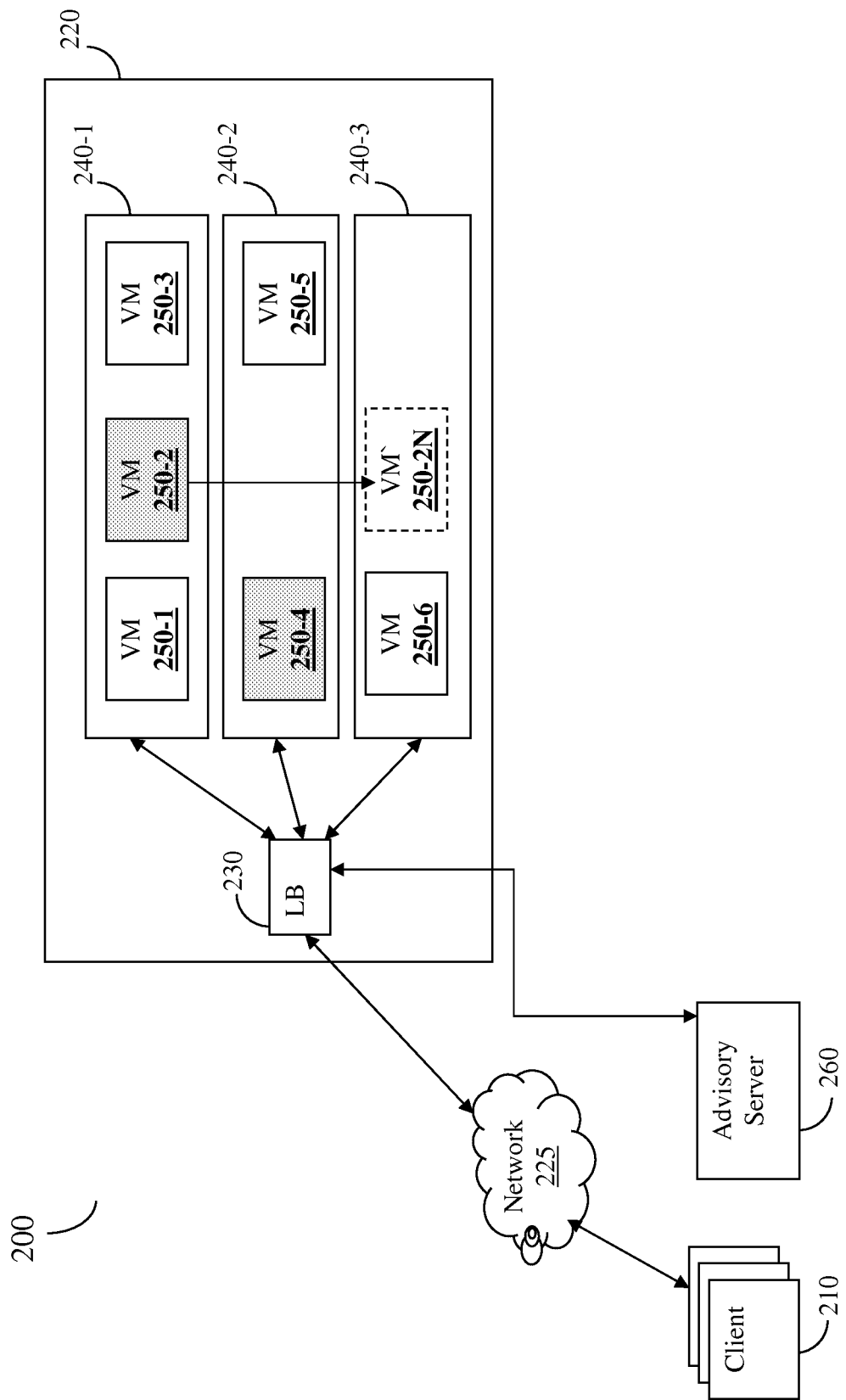
FIG. 2 is a diagram of a datacenter system utilized to describe the load-balancer assisted live VM migration according to one embodiment.

FIG. 2 shows an exemplary and non-limiting diagram of a datacenter 200 utilized to describe the load-balancer assisted live migration of VMs according to one embodiment. A plurality of users of clients (collectively shown as clients 210) can access, through a network 225, applications executed over the datacenter 220. A client 210 may be, but is not limited to, a personal computer (PC), a smartphone, a mobile phone, a tablet computer, a netbook computer, and the like. The client 210 runs a software application, (e.g., a browser) and an operating system (e.g., Windows®, Android®, Linux®, etc.) for accessing resources of the datacenters. The network 225 may be, for example, a local area network (LAN), a wide area network (WAN), the Internet, and the like.

The datacenter 220 includes a load balancer (LB) 230 and a plurality of physical machines 240-1, 240-2, and 240-3. A physical machine may be any computing or networking resource, such as a web server, a database server, a storage appliance, a network controller, a load balancer, and the like. Typically, a physical machine includes computing resources, such as memory, one or more central processing units (CPU), storage, network connectivity, and so on. Each of the physical machines 240-1 through 240-3 can execute one or more VMs 250 as discussed in detail above.

The load balancer 230 is a virtual or physical appliance, such as an ADC designed to distribute clients' 210 requests among the virtual machines in a datacenter in order to balance the load. The operation of load balancers and/or ADCs as discussed in related art, limits balancing requests to the virtual machines. Thus, conventional load balancers and/or ADCs cannot control the resource utilization of physical machines 240 by VMs 250.

In the exemplary datacenter 200, the physical machines 240-1, 240-2 and 240-3 execute VMs 250-1 through 250-6, where different VMs can serve an instance of the same application. For example, VMs 250-2 and 250-4 serve an instance of the application APP1. Thus, requests from clients 210 for the accessing of application APP1, can be distributed between the VMs 250-2 and 250-4. As will be described below in greater detail the distribution of requests may be based on the utilization of hardware resources of the physical machines 240-1 and 240-2.

In one embodiment, an advisory server 260 acts as a VM migration controller. That is, the advisory server 260 coordinates the migration of VMs in the datacenter 200. The advisory server 260 may monitor the load of each physical machine 240 or of the virtual machines to determine if workload balancing and/or migration of one or more VMs are required.

To allow efficient live migration of VMs, and in particular to ensure successful migration of VMs that are very loaded, according to the embodiments disclosed herein, the load balancer 230 is utilized during the live migration of VMs to ease the load on the VM to be migrated. With this aim, the advisory server 260 informs the load balancer 230 that a migration of a particular VM (e.g., VM 250-2) is about to start. In response, the load balancer 230 reduces the load on the VM 250-2, until the load reaches a comfort load level at which the migration process can be successfully performed and completed. Once the load reaches the comfort load level, the load balancer 230 informs the advisory server 260 that the migration process can be started. In another embodiment, the advisory server 260 initiates the live migration process and instructs the load balancer 230 to reduce the load on the VM to be migrated during its live migration. Thus, according to this embodiment, the advisory server does not wait for the load balancer to signal that the live migration can be started or resumed.

The migration process is a live migration process that includes copying of the CPU and memory image states. However, it should be appreciated that as the live migration process is performed only when the load on the VM to be migrated is low, this ensures that the memory state delta (i.e., the difference in the memory states between the source and target VMs) is low, hence copying the memory will likely be converged in a timely manner, with very a low impact on the APP1 service.

In one embodiment, the advisory server 260 may request the assistance of the load balancer 230 to reduce the load during the live migration process, if the current load on the VM to be migrated cannot allow successful completion of the migration process.

The load balancer 230 can reduce the load on a VM to be migrated (e.g., VM 250-2) using one or more of the following techniques. The load balancer 230 can direct requests (to be processed by the VM 250-2) from clients 210 to other physical machine(s) hosting VM(s) that can serve the clients' requests (i.e., VMs running the same application as the loaded VM). For example, the requests can be directed to VM 250-4 which executes the same instance application APP1 as VM 250-2. In an embodiment, the load balancer 230 can balance the distribution of clients' requests among physical machines hosting VMs that can serve the request based on the current hardware utilization in each machine, thus balancing the workload among the physical machines. The various embodiments for workload balancing are discussed in detail below.

In order to reduce the load, the load balancer 230 can also open new connection sessions, originally directed to the VM to be migrated, but with VMs hosted by different physical machines and can serve the new connection sessions. For example, new connection sessions can be opened with at a virtual machine VM 250-4 hosted on physical machines 240-2, which does not participate in the live migration process instead of the physical machine 240-1 hosting the VM 250-2. It should be noted that the physical machine 240-3, according to this example, is assigned to host the migrated VM 250-2 (labeled as 250-2N in FIG. 2). Another technique that can be utilized by the load balancer 230 includes throttling a network bandwidth directed to the VM to be migrated (e.g., VM 250-2).

Figure 3:
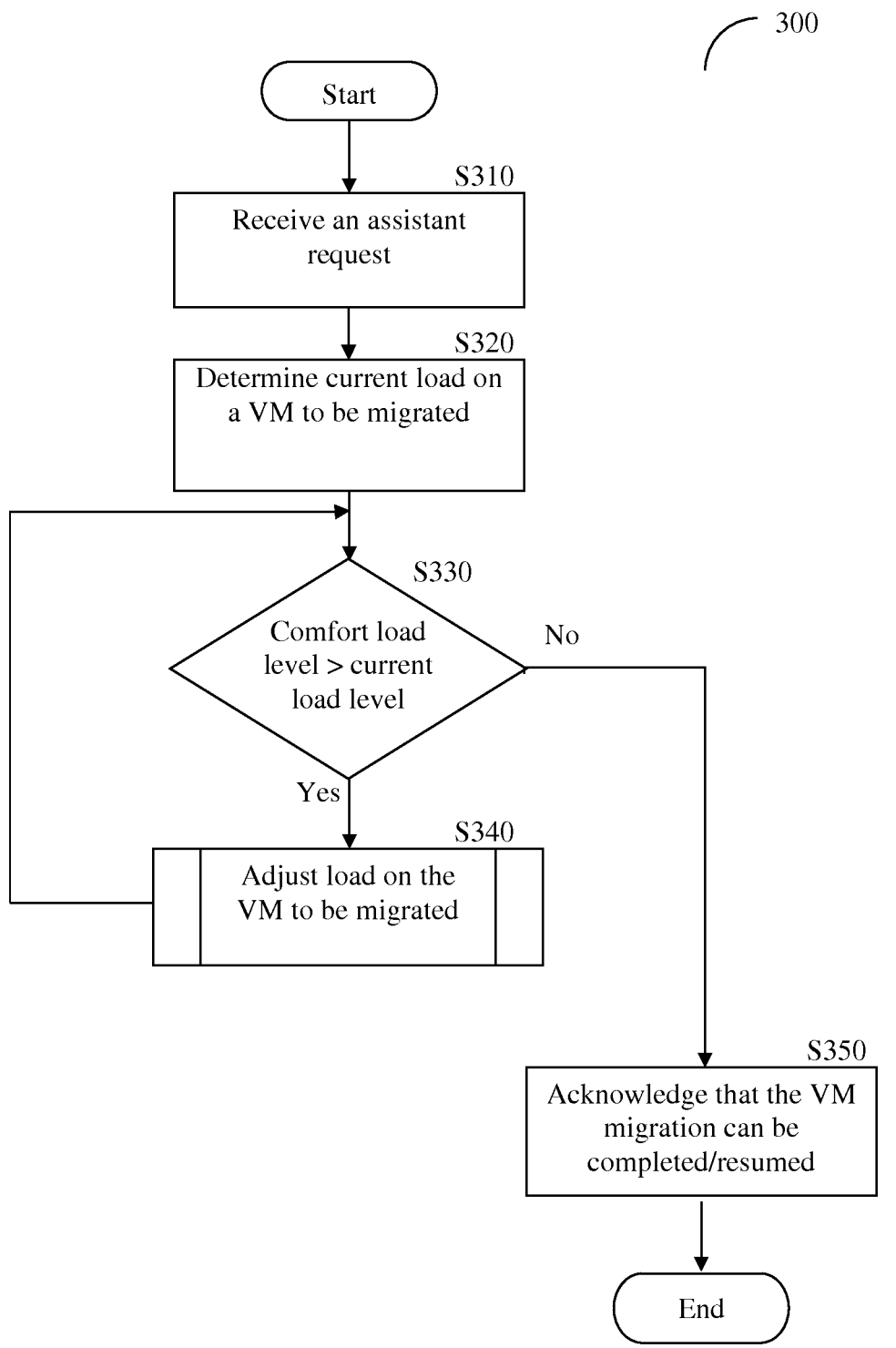
FIG. 3 is a flowchart of a load-balancer assisted live VM migration method according to various embodiments disclosed herein.

FIG. 3 shows an exemplary and non-limiting flowchart 300 illustrating the load-balancer assisted live VMs migration method according to one embodiment. The method described herein is performed by a load balancer (e.g., the load balancer 230) which controls the load of a VM to be migrated in order to enable successful completion of the live migration process, where the transfer of the VM from a source physical machine to a target physical machine is performed by those physical machines under the control of the advisory server acting as a VM migration controller.

As noted above, the live migration process can be initiated by a user or by the advisory server. This process is typically initiated when it is determined, for example, that the performance of the datacenter can be improved or optimized after the migration, or that the source physical machine should be shut down for maintenance purposes, and so on.

At S310, a request to assist an initiated live VM migration process is received at the load balancer (e.g., load balancer 230). This assist request is generated and sent by the advisory server and may include one or more of the following parameters: an identification (ID) of the VM be migrated, an ID of the physical machine hosting this VM, and a comfort load level value. The comfort load level indicates the load level on the VM to be migrated at which it is likely that the migration process will succeed. The comfort load level value can be pre-configured by a user (e.g., a system administrator) and/or based on gathered statistics related to various load measures and successful migration processor. The load level is measured by the hardware resources of the physical machine utilized by the VM to be migrated.

The hardware resource utilization is based on one or more of the following measurements: CPU utilization, i.e., the CPU cycles utilized by all CPU cores of the physical machine divided by the maximum cycles available on all of the cores; a memory allocation, i.e., the memory allocated out of the total available physical memory; a memory page swap rate (MPR); bandwidth utilization, i.e., the consumed bit rate divided by the available bandwidth on all network interface cards (NICs) installed in the physical machines; and a input/output (I/O) operations rate (IOR). Other resource utilization measures will be apparent to one of ordinary skill in the art. The comfort load level may include one or more of the above measurements. For example, it is safe to migrate the VM when the MPR is less than 20 pages per minutes, hence the comfort load level may indicate MPR<20. In one embodiment, the load balancer may be configured with the comfort load level per VM hosted on each physical machine.

It should be noted that the assist request may be received before or during the migration of a specific VM. Once the advisory server sends this request, it waits for an acknowledgment from the load balancer that the migration of the VM can start or resume.

At S320, the current load level on the VM to be migrated is determined. That is, the measures respective of utilization of the hardware resources are collected by the load balancer from a hypervisor of a VM to be migrated, or by any management system controlling the VMs installed in the physical machines.

At S330, the measured current load level is compared to the comfort load level parameter. If the measured load is higher than the load level parameter, execution continues with S340; otherwise, execution proceeds to S350. The load balancer determines from the collected measurements those that are related to load parameters set within the comfort load level parameter. For example, if the comfort load level parameter defines a level for the MPR, then the current measure of the swap rate of memory pages is compared to the comfort load level parameter.

At S340, the load on the VM to be migrated is adjusted to meet the comfort load level parameter. Then, execution returns to S330. Various techniques can be utilized by the load balancer to reduce the load on the VM. As noted above, these techniques include, but are not limited to, directing requests and traffic to other one or more VMs serving the same application regardless on which physical machine(s) such VMs are hosted, directing requests and traffic to other physical machines hosting VMs that can serve these requests and workload balancing among different physical machines, suspending the creation of new connection sessions with the VM to be migrated, and throttling a network bandwidth directed to the VM to be migrated (e.g., VM 250-2). It should be noted that one or more of these techniques can be performed concurrently or sequentially in order to reduce the load. For example, requests can be directed to other VMs and at the same time creation of the new connection sessions with the migrated VM can be suspended. Alternatively, requests can be first directed to other VMs, and then creation of the new connection sessions will take place.

Execution reaches S350 when the current measured load on the VM is below or equal to the comfort load level. At S350, an acknowledgment is generated and sent to the advisory server acknowledging that the load on the VM has been reduced, thus the live migration of the VM can start or resume.

In one exemplary embodiment, discussed in detail above, the migration process includes copying the CPU state, the memory image, and the network connections from the source physical machine to the target physical machine. As the processing performed by the VM to be migrated is reduced as a result of S340, the amount of data and memory changes that should be copied from one machine to another are also reduced, thereby shortening the time it takes to complete the live VM migration process. Further, as less data and memory changes need to be migrated to the destination physical machine, the probability that the live migration process will be successfully completed is significantly increased and probability for any impact of the service during migration is significantly decreased. Once the live migration is completed, the load balancer is informed on the completion of the migration. Thereafter, the load balancer balances the load traffic among all VMs according to the scheme with which the load balancing scheme is configured.

In another embodiment, the load-balancer assisted live VMs migration method can be performed without using the comfort load level value. That is, according to this embodiment, the comfort load level value is not included in the assist request. The load balancer can receive an assist request prior to or during a live migration of a VM to reduce the load on the migrated-VM. Further, the advisory server does not wait to a confirmation that the load on the migrated-VM reaches a certain level. Instead once the load on the migrated-VM has been reduced, the migration process can be completed. For example, copying of the memory state is performed when the load has been reduced. It should be noted that also according to this embodiment the live migration can be concurrently performed with the process of reducing the load. Alternatively, the assist request can be received prior to the execution of the live migration, and once it is determined, for example, by the advisory server that the load on the migrated-VM has been reduced, the live migration process begins.

Figure 4:
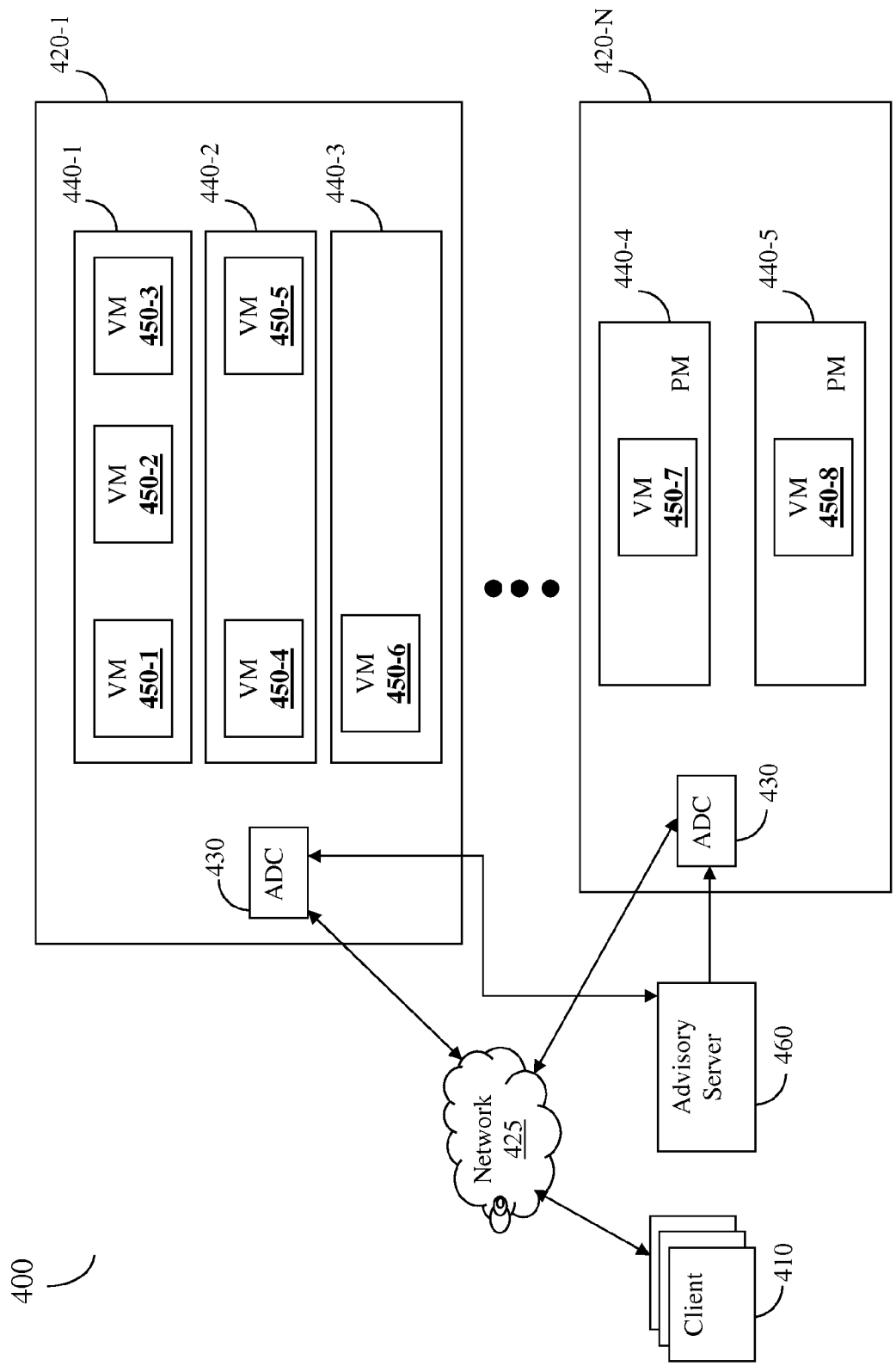
FIG. 4 is a deployment of a multi-datacenter utilized to describe the load-balancer assisted live VM migration according to another embodiment.

FIG. 4 shows a diagram of a multi-datacenter system 400 in which the embodiments of the live migration process discussed herein can also be utilized. A plurality of users of clients (collectively shown as clients 410) can access, through a network 425, applications executed over one or more datacenters 420-1 through 420-N, each of which may be located at a different geographic location (site).

Each datacenter 420-1 through 420-N includes an application delivery controller (ADC) 430. The ADCs 430 deployed in the datacenters 420-1 through 420-N can communicate with each other for the purpose of global load balancing, i.e., redirecting traffic between the datacenters. Each of the ADCs 430 may be a virtual or physical appliance and is configured to perform the methods described in detail above.

Each datacenter 420-1 includes a plurality of physical machines. For example, as shown in FIG. 4, the datacenter 420-1 includes physical machines 440-1, 440-2 and 440-3, while the datacenter 420-N includes physical machines 440-4 and 440-5. As noted above, a physical machine may be any computing or networking resource, such as a web server, a database server, a storage appliance, a network controller, and the like. Each of the physical machines 440-1 through 440-5 can execute one or more VMs 450 as discussed in detail above. In the deployment illustrated in FIG. 4, the advisory server 460 communicates with the ADCs 430 and acts a VM migration controller.

Specifically, the advisory server 460 can request the assistance of each of the ADCs 430 in the live migration process. That is, the traffic towards one datacenter can be adjusted, and traffic towards one physical machine hosting a VM to be migrated can be adjusted by each ADC connected thereto using global and/or local load balancing as needed. With this aim, the advisory server 460 sends an assist request to one or more of the ADCs 430 requesting to reduce the current load on the VM to be migrated in order to meet the comfort load level set for this VM. The load can be reduced using one or more of the techniques discussed above.

It should be noted that the traffic can also be redirected and new connection sessions can be established with virtual machines hosted on physical machine(s) located in a datacenter different than the datacenter in which the VM to be migrated resides. For example, traffic originally directed to VM 450-2 in datacenter 420-1 can be rerouted, by global load balancing protocol between the ADCs 430, to VM 450-7 in the datacenter 420-N in order to reduce the load on the VM 450-2. It should be further noted that in the multi-datacenter system 400, VMs can be transferred between physical machines in the same datacenters or between physical machines in different datacenters. For example, the VM 450-2 in datacenter 420-1 can be migrated to the physical machine 440-4 in the datacenter 420-N.

As noted above, one of the techniques for reducing the load on a particular VM is by balancing the workload among a plurality of physical machines, where each physical machine hosts at least one VM that runs an instance of the application being executed by the VM to be migrated. For example, in the system 400, the physical machines 440-1, 440-2 and 440-3 in datacenter 420-1 execute VMs 450-1 through 450-6, where VM 450-1, 450-4, and 450-6 serve an instance of the application APP2. The physical machines 440-4 and 440-5 in the datacenter 420-N execute VMs 450-7 and 450-8 that also serve an instance of the application APP2. Thus, the workload of a migrated VM 450-1 can be distributed among the 450-4, 450-6, 450-7, and 450-8 according to the resource utilization of the physical machines 440-1 through 440-5.

The workload balancing techniques are based, in part, on the utilization of a physical machine's resources. As mentioned above, the resource utilization is based on one or more of the following measurements: CPU utilization; a memory allocation; bandwidth utilization; an input/output (I/O) operations rate (IOR); and a memory page swap rate (MPR). Other resource utilization measures will be apparent to one of ordinary skill in the art.

These measures can be collected by the at least one of the ADCs (e.g., ADCs 430) and the load balancer (e.g., load balancer 230) from a hypervisor of a VM or the advisory server acting as a management system controlling the VMs installed in the physical machines. In one embodiment, the utilization of a particular resource may be an average of its respective utilization measurements over a configurable period of time. The time period is based on the application. For example, for time sensitive applications, the time period is relatively short, for example, 5 seconds for a time sensitive application versus 120 seconds for other applications.

Figure 5:
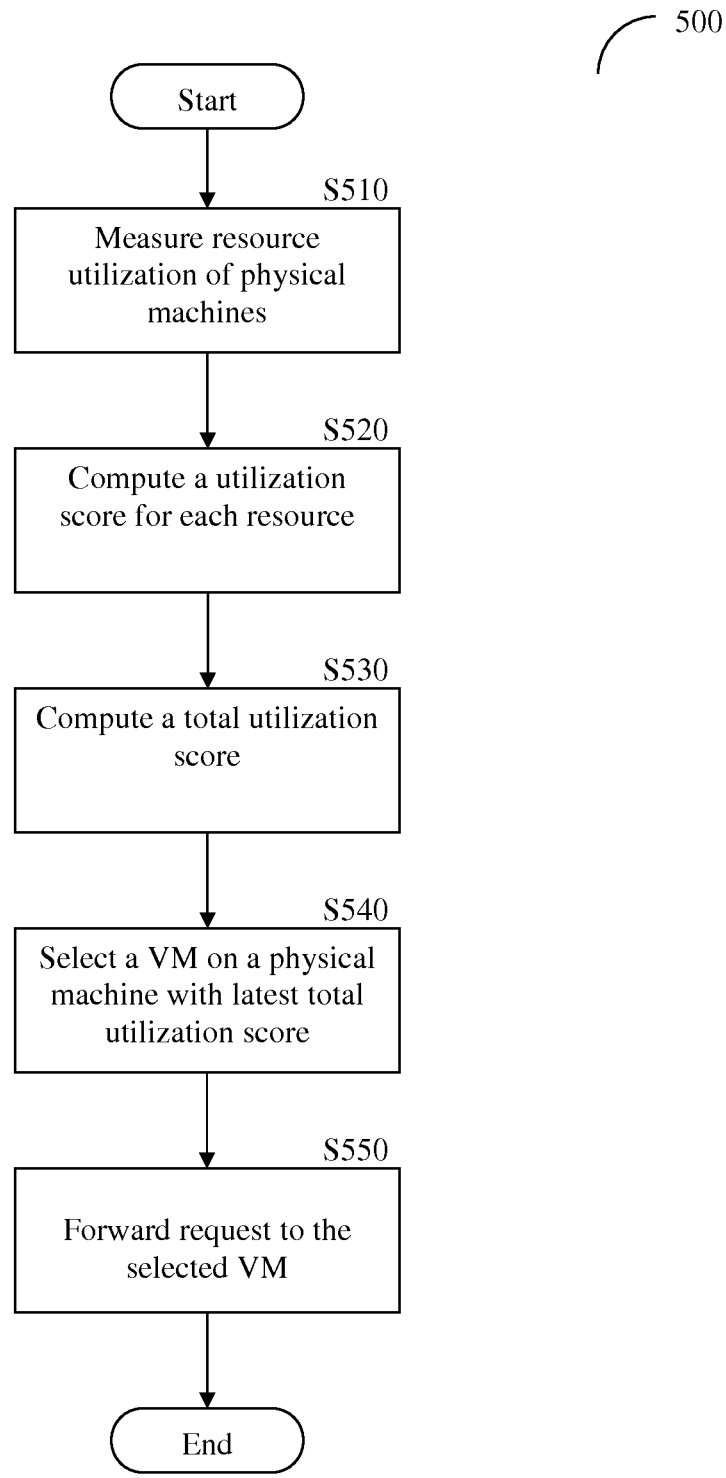
FIGS. 5 and 6 are flowcharts describing techniques for workload balancing among a plurality of physical machines hosting a plurality of VMs according to certain embodiments disclosed herein.

FIG. 5 shows an exemplary and non-limiting flowchart 500 describing the method for workload balancing among a plurality of physical machines hosting a plurality of VMs according to an embodiment of the invention. The method balances requests among a plurality of VMs that run an instance of the same application. That is, the method selects the VM to serve a request (received from a client) of the application. Different VMs hosted over different physical machines in one or more datacenters can be selected to serve an incoming request.

At S510, the resource utilization of each resource in each physical machine that hosts the VMs that can execute the application to be load balanced is periodically measured. As mentioned above, the resource utilization measures include, but are not limited to, CPU utilization, memory allocation, page swap rate, I/O operation rates, and bandwidth utilization. The resource utilization of a physical machine resource is an average of a number of measurements over time.

At S520, for each physical machine (pm) and a resource type (r), a resource utilization (RU) score is computed, for example, as follows:

$$\text{RU\_Score}(pm, r) = \text{weight}(r) \frac{(1 - RU(pm, r))}{\text{load\_TH}(r)} \quad [\text{Eq. 1}]$$

where, the weight (r) is determined based on the relevancy of the respective measure utilization for the resource for the proper execution of the application. For example, if the application is CPU intensive, the weight of the CPU utilization measure is higher than the weights of other resources. The RU(pm,r) parameter is the resource utilization measured for the resource 'r' and the load_TH(r) is the threshold value between 0 and 1 representing the utilization percentage (e.g., between 0%-100%) set for the resource. It should be noted that the load_TH(r) may have the same value for the same type of resource regardless of the physical machines. For example, the load_TH value for the memory resource in each physical machine (pm) can be set to a value of 0.85, i.e., the memory utilization should not exceed 85%.

It should be noted that the utilization score may not be computed for the physical machine hosting the VM to be migrated, thus such a machine may not be part of the workload balancing. As a result, less traffic is directed to the migrated VM.

In one embodiment, the score is computed for each physical machine (and each of its resources) that hosts one or more VMs that can execute an instance of the application. In another embodiment, the score is computed for only a subset of such physical machines. The subset of physical machines includes only physical machines in which none of the resources exceeds their respective load thresholds or machines with the least significant over-utilized resource (e.g., I/O rate).

At S530, a total utilization score for each physical machine is computed as the sum of scores for the resources of the physical machine divided by the sum of the weights of the resources. That is, the total utilization score of a physical machine (PMU_Score) is computed, for example, as follows:

$$\text{PMU\_Score}(pm) = \frac{\sum_r \text{RU\_Score}(pm, r)}{\sum_r \text{weight}(r)} \quad [\text{Eq. 2}]$$

At S540, the physical machine with the lowest total utilization score is determined and a VM hosted on this physical machine is selected to serve the request. Thus, the selection is in accordance with the least utilized physical machine. It should be noted that if the determined physical machine hosts two or more VMs that can serve the client request, the target VM is arbitrarily selected. At S550, the client request is forwarded to the selected VM.

The method discussed herein can be performed by the advisory server, each of the ADCs installed in the datacenters, the load balancer, or by the operation by one or more of an advisory server, and each of the ADCs, and the load balancer. Specifically, the advisory server can independently perform the resource utilization measures or receive such measures from the ADCs.

That is, the load balancing decision is made by an advisory server. The advisory server gathers and holds information with regard to the resource utilization of every physical machine in the system, and thus can make a correlative decision with regard to the best VM to which to forward an incoming request. According to this embodiment, an ADC inquires to the advisory server for the forwarding decision. In response, the advisory server instructs the load balancer receiving the client's request to forward the request to one of the VMs that can support the execution of an application to which the request belongs. In a particular embodiment, to ease the load on the VM to be migrated, requests are not forwarded to this VM.

It should be appreciated that the method described with reference to FIG. 5 provides real-time workload balancing, and thus is applicable for time sensitive applications. The forwarding decision may be made for each incoming client request. It should be further appreciated that the method is fully distributed. That is, each ADC measures the same resources on the same physical machines, thus the workload is diverted to physical machines that are least likely to congest and preferably are least loaded. It should also be appreciated that the flow of the FIG. 5 flowchart does not necessarily require each step to be carried out in a precise order or timing.

Figure 6:
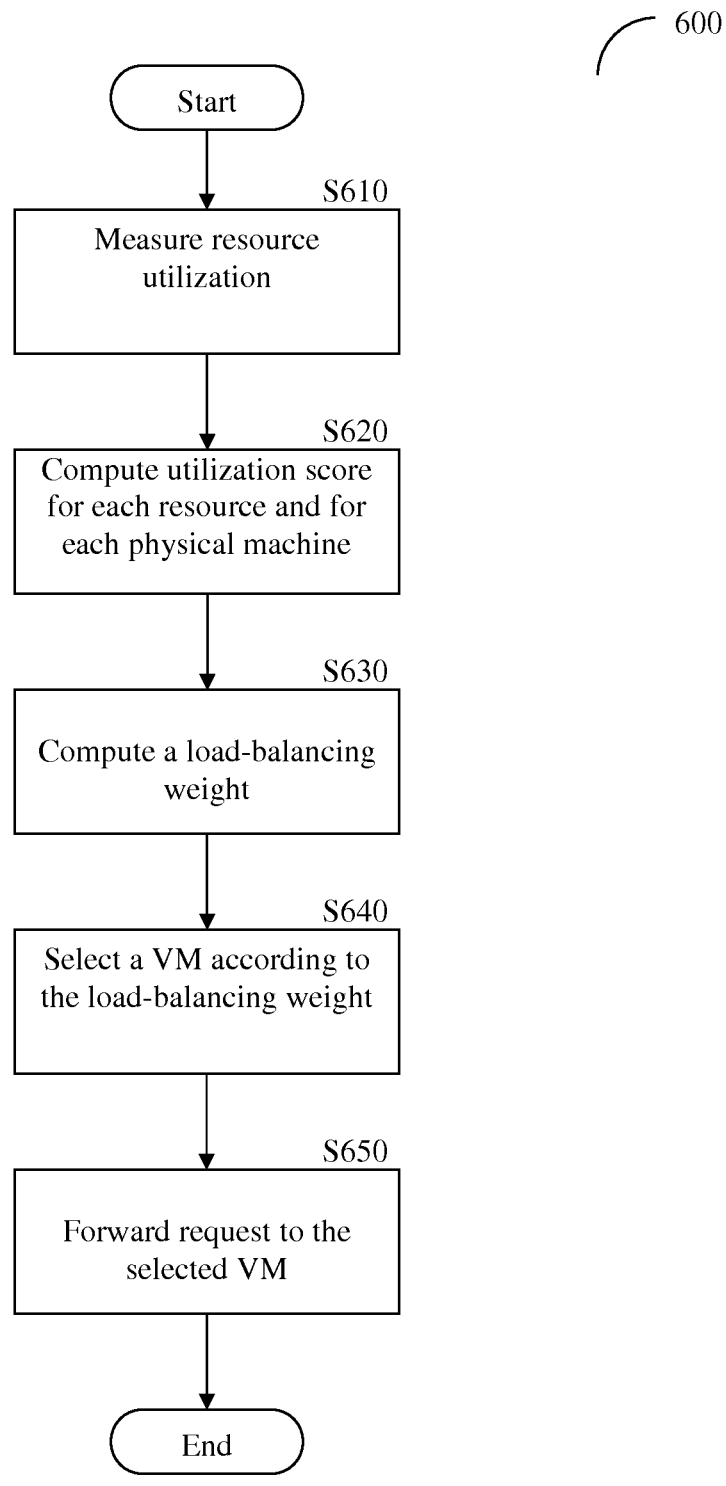

FIG. 6 shows an exemplary and non-limiting flowchart 600 for workload balancing among a plurality of physical machines hosting a plurality of VMs according to another embodiment of the invention. The method can be performed by each of the ADCs, a load balancer, and/or an advisory server. The method workload balances requests among a plurality of VMs that run an instance of the same application by observing trends in the utilization of resources. Based on the determined trends, the method sets load-balancing weights associated with physical machines. Accordingly, a highly utilized physical machine is set with a low load-balancing weight and vice versa. The load-balancing weight determines the relative number of requests that are to be dispatched to a respective physical machine compared to other physical machines. For example, a physical machine with a load-balancing weight of '4' receives twice as many requests in comparison to a physical machine with weight of '2'. In a particular embodiment, the load-balancing weight of a physical machine hosting the VM to be migrated is significantly lower that the weight set for other machines, thereby ensuring that as few as possible requests will be forwarded to the physical machine hosting the migrated VM.

At S610, the utilization of each resource in each physical machine that hosts the VMs running an instance of the application to be load balanced is measured. As mentioned above, the resource utilization of a resource is an average of a number of measurements over a period of time. In this particular embodiment, the period of time is configured for a relatively long time, e.g., 60-300 seconds.

At S620, the utilization score of each resource on each physical machine hosting the VM is computed as shown in equation 1 (Eq. 1). In addition, the total utilization score for each physical machine is computed as demonstrated in equation 2 (Eq. 2). At S630, the load-balancing weight ($LB_w$) for each physical machine (pm) is computed as the round number of a predefined value (v) divided by the total utilization score calculated for the physical machine. That is, $$LBw(pm) = \frac{v}{PMU\_Score(pm)};$$ [Eq. 3]

where, PMU_Score is the utilization score computed for a physical machine, and v is the predefined value (e.g. 100).

At S640, upon reception of a client request, the target VM is selected according to the proportion of the load-balancing weights of physical machines hosting VMs that can serve the request. At S650, the client request is forwarded to the selected VM. It should also be appreciated that the flow of the FIG. 6 flowchart does not necessarily require each step to be carried out in a precise order or timing.

It should be apparent to one of ordinary skill that the load balancing process discussed above can be combined with the global load balancing criteria, such as proximity, a load of a given site, and so on. That is, a physical machine may be selected based on its computed load-balancing weight and one or more global load balancing criteria.

In another embodiment of the invention, the VM to serve a client request can be selected based on a normalized score computed for the physical machine hosting the VM. The normalized score is the total resource utilization score computed as shown in equation 2 (Eq. 2) above divided by the load-balancing weight of the physical machine. According to this embodiment, a client request is sent to a VM hosted on a physical machine with the lowest normalized score.

It should be noted that the workload balancing process discussed above can be combined with the global load balancing criteria, such as proximity, a load of a given site, and so on. That is, a physical machine may be selected based on its computed total utilization score and one or more global load balancing criteria.

The various embodiments disclosed herein can be implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for an assisted live migration of virtual machines, comprising:
   monitoring, by an advisory server, at least a workload of physical machines in a datacenter;
   determining if at least one physical machine is overloaded based on the monitored workload;
   for each of the at least one physical machine determined to be overloaded, selecting at least one virtual machine residing in the respective physical machine, wherein the selection is based at least on a current load of the virtual machine; and
   initiating a live migration of the selected virtual machine when the current load is lower than a comfort load level.

2. The method of claim 1, further comprising:
   comparing the current load of the selected virtual machine to the comfort load level; and
   reducing a load on the selected virtual machine until the current load is lower than the comfort load level.

3. The method of claim 2, wherein reducing the load on the selected virtual machine further comprises:
   redirecting at least incoming requests from the selected virtual machine to at least one virtual machine running a same instance of a software application as the selected virtual machine.

4. The method of claim 3, further comprising at least one of:
   suspending a creation of new connection sessions with the selected virtual machine;
   throttling a network bandwidth directed to the selected virtual machine; and
   balancing workload of the selected virtual machine with a plurality of physical machines hosting one or more virtual machines running the same instance of the software application.

5. The method of claim 4, wherein balancing the workload of the selected virtual machine further comprises:
   periodically measuring a utilization of each hardware resource in each of the plurality of physical machines;
   computing a resource utilization score for each hardware resource based on its respective measured utilization;
   computing a total physical machine utilization score for each physical machine based on the computed resource utilization scores of its respective resources;
   upon reception of a request corresponding to the software application, selecting one physical machine of the plurality of physical machines to serve the request, wherein the selection is based on the computed total physical machine utilization; and
   forwarding the request to a virtual machine hosted on the selected physical machine.

6. The method of claim 5, wherein the physical machine with a lowest total physical machine utilization score is selected to serve the client request.

7. The method of claim 4, wherein balancing the workload of the selected virtual machine further comprises:
periodically measuring a utilization of each hardware resource in each of the plurality of physical machines;
computing a resource utilization score for each hardware resource based on its respective measured utilization;
computing a total physical machine utilization score for each physical machine based on the computed resource utilization scores of its respective resources;
computing a load-balancing weight for each physical machine based on its computed total physical machine utilization score; and
distributing requests corresponding to the software application to the plurality of physical machines proportional to the load-balancing weight computed for each physical machine, wherein the client requests are served by the plurality of virtual machines hosted on the plurality of physical machines.

8. The method of claim 2, wherein the load is reduced by a load balancer connected to a plurality of physical machines hosting a plurality of virtual machines including at least the selected virtual machine.

9. The method of claim 1, wherein the live migration of the selected virtual machine includes at least copying a memory state, a processor state, and network connections from a current physical machine hosting the virtual machine to a new physical machine, wherein the copying is performed while the virtual machine is operational.

10. The method of claim 1, wherein the comfort load level defines at least one load parameter respective of a load on the selected virtual machine, wherein the load defined by the at least one load parameter respective is set to a value at which the live migration of the virtual machine is likely to succeed, wherein the comfort load level is defined by utilization of hardware resources of a physical machine.

11. The method of claim 10, wherein determining the current load includes collecting measures of hardware resource utilization from at least one of: a hypervisor of the selected virtual machine and a virtual machine management system, wherein the collected measures are respective of the at least one load parameter defined in the comfort load level.

12. The method of claim 1, wherein the determination if at least one physical machine is overloaded is further based on at least one of: a total utilization score and at least one load balancing criteria.

13. A non-transitory computer readable medium having stored thereon instructions for causing a processor to perform a method of claim 1.

14. A system configured to perform an assisted live migration of virtual machines, comprising:
a processing unit; and
a memory connected to the processing unit, the memory containing instructions that when executed by the processing unit, configure the system to:
monitor at least a workload of physical machines in a datacenter;
determine if at least one physical machine is overloaded based on the monitored workload;
for each of the at least one physical machine determined to be overloaded, select at least one virtual machine residing in the respective physical machine, wherein the selection is based at least on a current load of the virtual machine; and
initiate a live migration of the selected virtual machine when the current load is lower than a comfort load level.

15. The system of claim 14, wherein the system is further configured to:
compare the current load of the selected virtual machine to the comfort load level; and
reduce a load on the selected virtual machine until the current load is lower than the comfort load level.

16. The system of claim 15, wherein the system is configured to reduce the load on the selected virtual machine until the current load is lower than the comfort load level by being further configured to:
redirect at least incoming requests from the selected virtual machine to at least one virtual machine running a same instance of a software application as the selected virtual machine.

17. The system of claim 15, wherein the system is further configured to reduce the load on the selected virtual machine until the current load is lower than the comfort load level by performing at least one of:
suspend a creation of new connection sessions with the selected virtual machine;
throttle a network bandwidth directed to the selected virtual machine; and
balance workload of the selected virtual machine with a plurality of physical machines hosting one or more virtual machines running the same instance of the software application.

18. The system of claim 15, wherein the load is reduced by a load balancer connected to a plurality of physical machines hosting a plurality of virtual machines including at least the selected virtual machine.

19. The system of claim 14, wherein the live migration of the selected virtual machine includes at least copying a memory state, a processor state, and network connections from a current physical machine hosting the virtual machine to a new physical machine, wherein the copying is performed while the virtual machine is operational.

20. The system of claim 14, wherein the comfort load level defines at least one load parameter respective of a load on the selected virtual machine, wherein the load defined by the at least one load parameter respective is set to a value at which that the live migration of the virtual machine is likely to succeed, wherein the comfort load level is defined by utilization of hardware resources of a physical machine.

21. The system of claim 20, wherein the system is further configured to:
periodically measure a utilization of each hardware resource in each of the plurality of physical machines;
compute a resource utilization score for each hardware resource based on its respective measured utilization;
compute a total physical machine utilization score for each physical machine based on the computed resource utilization scores of its respective resources;
upon reception of a request corresponding to the software application, select one physical machine of the plurality of physical machines to serve the request, wherein the selection is based on the computed total physical machine utilization; and
forward the request to a virtual machine hosted on the selected physical machine.

22. The system of claim 20, wherein the system is further configured to:
periodically measure a utilization of each hardware resource in each of the plurality of physical machines;

compute a resource utilization score for each hardware resource based on its respective measured utilization;

compute a total physical machine utilization score for each physical machine based on the computed resource utilization scores of its respective resources;

compute a load-balancing weight for each physical machine based on its computed total physical machine utilization score; and distribute requests corresponding to the software application to the plurality of physical machines proportional to the load-balancing weight computed for each physical machine, wherein the client requests are served by the plurality of virtual machines hosted on the plurality of physical machines.

23. The system of claim 14, wherein the determination if at least one physical machine is overloaded is further based on at least one of: a total utilization score and at least one load balancing criteria.

* * * * *